United States Patent
Rimmington

(10) Patent No.: US 9,809,393 B2
(45) Date of Patent: Nov. 7, 2017

(54) CONTROLLING A CONVEYOR IN A MINING SYSTEM

(71) Applicant: Joy MM Delaware, Inc., Wilmington, DE (US)

(72) Inventor: Gareth Rimmington, Barnsley (GB)

(73) Assignee: Joy MM Delaware, Inc., Wilmington, DE (US)

(*) Notice: Subject to any disclaimer, the term of this patent is extended or adjusted under 35 U.S.C. 154(b) by 60 days.

(21) Appl. No.: 14/707,007

(22) Filed: May 8, 2015

(65) Prior Publication Data

US 2016/0325940 A1   Nov. 10, 2016

(51) Int. Cl.
  *B65G 43/00* (2006.01)
  *B65G 23/44* (2006.01)
  *E21F 13/06* (2006.01)

(52) U.S. Cl.
  CPC ............ *B65G 43/00* (2013.01); *B65G 23/44* (2013.01); *E21F 13/06* (2013.01)

(58) Field of Classification Search
  CPC ........ B65G 23/44; B65G 43/00; B65G 43/02; B65G 2812/02099; E21F 13/06
  USPC ............................................ 198/810.04, 813
  See application file for complete search history.

(56) References Cited

U.S. PATENT DOCUMENTS

| | | | |
|---|---|---|---|
| 4,284,192 A * | 8/1981 | Taylor | B65G 23/44 198/813 |
| 4,657,131 A | 4/1987 | Brychta et al. | |
| 5,030,173 A | 7/1991 | Bryant | |
| 5,054,607 A | 10/1991 | Braun et al. | |
| 5,131,528 A | 7/1992 | Bandy, Jr. | |
| 5,641,058 A * | 6/1997 | Merten | B65G 23/44 198/810.04 |

(Continued)

FOREIGN PATENT DOCUMENTS

| | | |
|---|---|---|
| GB | 2493102 A | 1/2013 |
| PL | 176187 B1 | 4/1999 |
| PL | 2188197 T3 | 2/2012 |

OTHER PUBLICATIONS

Search Report from the United Kingdom Intellectual Property Office for Application No. GB1607970.9 dated Dec. 6, 2016 (2 pages).

(Continued)

*Primary Examiner* — Gerald McClain
*Assistant Examiner* — Keith R Campbell
(74) *Attorney, Agent, or Firm* — Michael Best & Friedrich LLP

(57) ABSTRACT

A conveyor for a mining system. The conveyor includes a sprocket, a chain, a drive mechanism, a hydraulic cylinder, and a controller. The chain is associated with the sprocket and has a top chain portion and a bottom chain portion. The drive mechanism is coupled to the sprocket and is operable to drive the sprocket. The controller includes a processing unit and a memory. The controller is configured to receive a first signal related to a characteristic of the drive mechanism, receive a second signal related to a reaction force of the sprocket, calculate a tension of the top chain portion based on the first signal and the second signal, and generate a control signal for controlling a position of the hydraulic cylinder based on the determined tension of the top chain portion.

19 Claims, 8 Drawing Sheets

(56) References Cited

U.S. PATENT DOCUMENTS

| | | | |
|---|---|---|---|
| 6,029,799 | A | 2/2000 | Weigel et al. |
| 7,793,775 | B2 | 9/2010 | Rozenfeld et al. |
| 8,061,510 | B2 | 11/2011 | Tout |
| 8,387,777 | B2 | 3/2013 | Tokhtuev et al. |
| 8,636,140 | B2 | 1/2014 | Tout et al. |
| 8,783,446 | B2 | 7/2014 | Martin |
| 2010/0270131 | A1 | 10/2010 | Vasey |
| 2013/0068594 | A1* | 3/2013 | Worthington .......... B65G 23/44 198/810.04 |

OTHER PUBLICATIONS

Search Report from the Polish Patent Office for Application No. P-417101 dated Oct. 12, 2016 (2 pages).

* cited by examiner

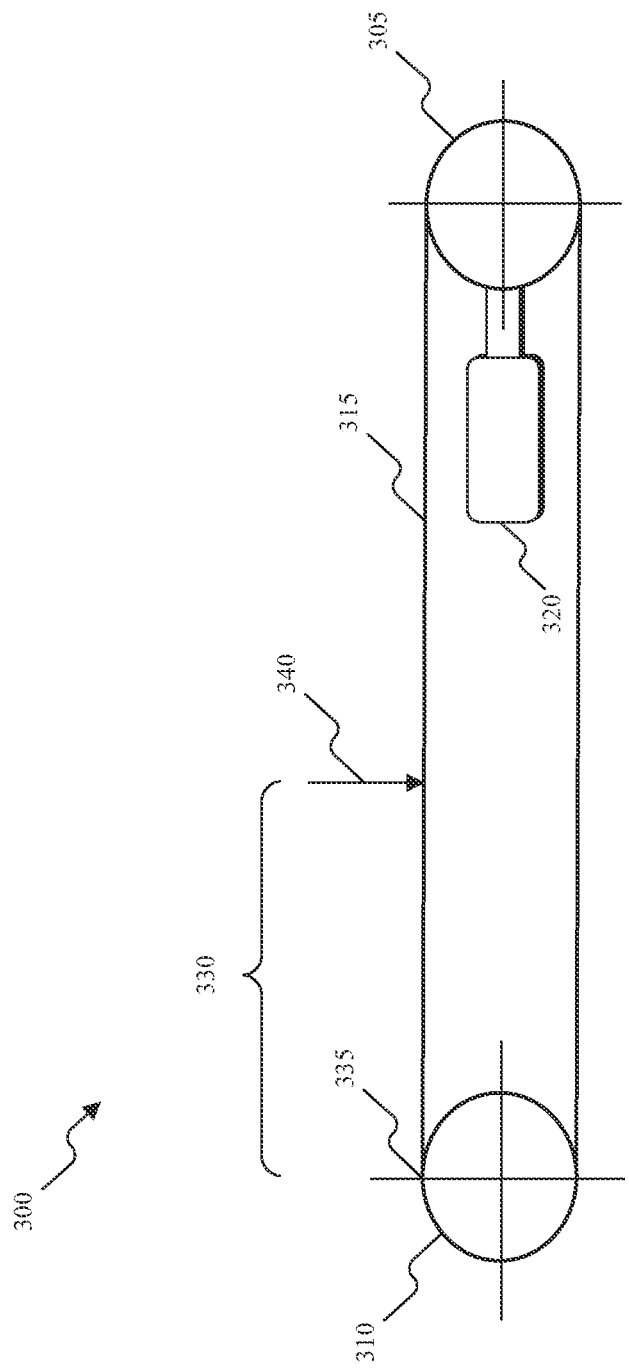

CONTROLLING A CONVEYOR IN A MINING SYSTEM

BACKGROUND

This invention relates to the control of a conveyor, such as an armored face conveyor ("AFC") or a beam stage loader ("BSL").

SUMMARY

Longwall mining systems include, among other things, a conveyor such as an AFC or BSL, to transport a mined material (e.g., coal) from an area where the material is being mined to an area for processing (e.g., crushing, storage, etc.). AFCs include, for example, a first sprocket and a second sprocket around which a chain is provided. The chain is driven by one or more drive mechanisms or motors (e.g., a maingate motor, a tailgate motor, etc.), and the movement of the chain around the sprockets causes the conveyor to transport the mined material. Conventional conveyors that include an extendable return end frame use pre-tensioning techniques to increase chain tension around the sprockets and avoid a slack chain or zero tension condition. The pre-tensioning techniques include, for example, using a hydraulic cylinder to push the first sprocket away from the second sprocket.

This invention generally provides, among other things, techniques for determining chain tension and controlling a conveyor to automatically control chain tension by altering a sprocket position with a hydraulic cylinder. The invention may be used in conjunction with, for example, a conveyor in which a first end of the conveyor is fixed and a second end of the conveyor is extendable. For such conveyors, the tension in the chain varies along the length of the conveyor, and zero tension or slack chain conditions should be avoided in order to maximize the reliability of the conveyor. As such, one construction of the system includes a conveyor having an extendable return end frame, a first sprocket, a second sprocket, one or more hydraulic cylinders, one or more chains, and a controller. At least one of the first sprocket and the second sprocket includes a drive mechanism (e.g., a motor and a motor controller). The drive mechanism turns the associated first sprocket or second sprocket to transport a mined material from a first location to a second location, and the controller uses a measured sprocket reaction force and a calculated bottom chain force to calculate a top chain force that is related to the tension of the one or more chains. The determined top chain force is used to automatically control the position of the one or more hydraulic cylinders and sprockets.

In one embodiment, the invention provides a conveyor for a mining system. The conveyor includes a first sprocket, a second sprocket, a chain, a drive mechanism, a sensor, a load cell, a hydraulic cylinder, and a controller. The first sprocket has a first position, and the second sprocket has a second position. The first position is separated from the second position by a distance. The chain is associated with the first sprocket and the second sprocket, and the chain has a top chain portion and a bottom chain portion. The drive mechanism is coupled to one of the first sprocket or the second sprocket and is operable to drive the one of the first sprocket or the second sprocket. The sensor is operable to generate a first signal related to a characteristic of the drive mechanism. The load cell is operable to generate a second signal related to a reaction force of the one of the first sprocket or the second sprocket. The controller includes a processing unit and a memory. The controller is configured to receive the first signal from the sensor, receive the second signal from the load cell, calculate a tension of the top chain portion based on the first signal and the second signal, and generate a control signal for controlling a position of the hydraulic cylinder based on the determined tension of the top chain portion to control the distance between the first sprocket and the second sprocket.

In another embodiment, the invention provides a method of controlling tension of a conveyor chain. The conveyor chain has a top chain portion and a bottom chain portion. The method includes receiving a first signal related to a characteristic of a drive mechanism, and receiving a second signal related to a reaction force of a sprocket. The drive mechanism is operable to drive the sprocket. The method also includes calculating, with a processor, a tension of the top chain portion of the conveyor chain based on the first signal and the second signal, and generating a control signal for controlling a position of a hydraulic cylinder based on the calculated tension of the top chain portion.

In another embodiment, the invention provides a conveyor for a mining system. The conveyor includes a sprocket, a chain, a drive mechanism, a hydraulic cylinder, and a controller. The chain is associated with the sprocket and has a top chain portion and a bottom chain portion. The drive mechanism is coupled to the sprocket and is operable to drive the sprocket. The controller includes a processing unit and a memory. The controller is configured to receive a first signal related to a characteristic of the drive mechanism, receive a second signal related to a reaction force of the sprocket, calculate a tension of the top chain portion based on the first signal and the second signal, and generate a control signal for controlling a position of the hydraulic cylinder based on the determined tension of the top chain portion.

Before any embodiments of the invention are explained in detail, it is to be understood that the invention is not limited in its application to the details of the configuration and arrangement of components set forth in the following description or illustrated in the accompanying drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components may be utilized to implement the invention. For example, "servers" and "computing devices" described in the specification can include one or more processing units, one or more computer-readable medium modules, one or more input/output interfaces, and various connections (e.g., a system bus) connecting the components.

Independent aspects of the invention will become apparent by consideration of the detailed description and accompanying drawings.

BRIEF DESCRIPTION OF THE DRAWINGS

FIGS. 3A, 3B, and 3C are diagrams illustrating generalized conveyors and a "danger zone" of the conveyors.

DETAILED DESCRIPTION

The invention described herein relates to a chain conveyor system and the control thereof. The chain conveyor system includes, for example, an armored face conveyor ("AFC"), a beam stage loader ("BSL"), or another conveyor or mining conveyor. For descriptive purposes, the invention is described herein with respect to embodiments of the invention that include an AFC. AFCs include, for example, a return end frame, a first sprocket, a second sprocket, a chain, one or more drive mechanisms or motors (e.g., a tailgate motor, a maingate motor, etc.), one or more hydraulic cylinders, and a controller. The controller is configured to receive signals related to a characteristic the one or more motors (e.g., motor torque) and a sprocket reaction force (e.g., from a load cell). Based on the received signals, the controller is operable determine a tension for a top portion of the chain. Based on the tension of the top portion of the chain, the controller determines one or more of a desired return end frame extension, a desired position for the one or more hydraulic cylinders, a desired position for the first sprocket, or a desired position for the second sprocket. For example, after the controller has determined a desired position for the one or more hydraulic cylinders, the controller controls the one or more hydraulic cylinders to the desired position to reposition the first sprocket.

Figure 1:
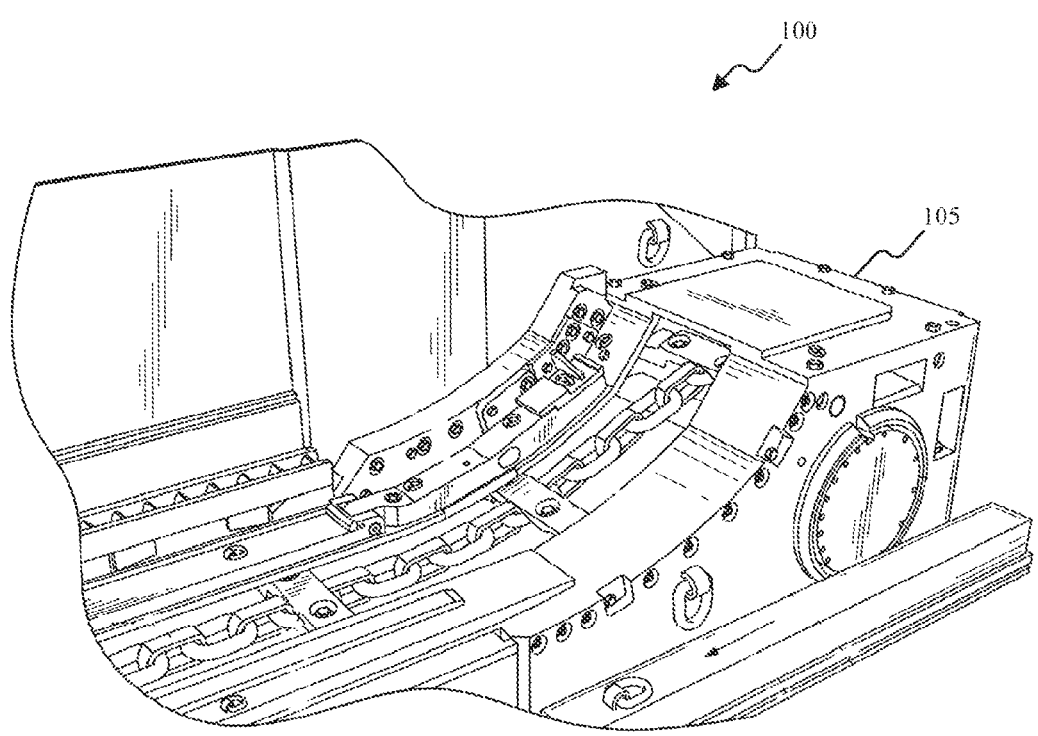
FIG. 1 illustrates an end frame of a chain conveyor.

FIG. 1 illustrates a portion of an AFC 100 that includes a return end frame 105. The return end frame 105 includes, among other things, a fixed frame portion, an extendable frame portion, and one or more hydraulic cylinders. The return end frame 105 is a part of a mining system that also includes, for example, a shearer. In some constructions, the position of the extendable frame portion is determined using a linear displacement sensor configured to measure the position of the extendable frame portion through its full range-of-motion. The position of the extendable frame portion may be modified (e.g., incremented or decremented) to correspondingly control the position of the one or more hydraulic cylinders, the first sprocket, the second sprocket, etc.

Figure 2:
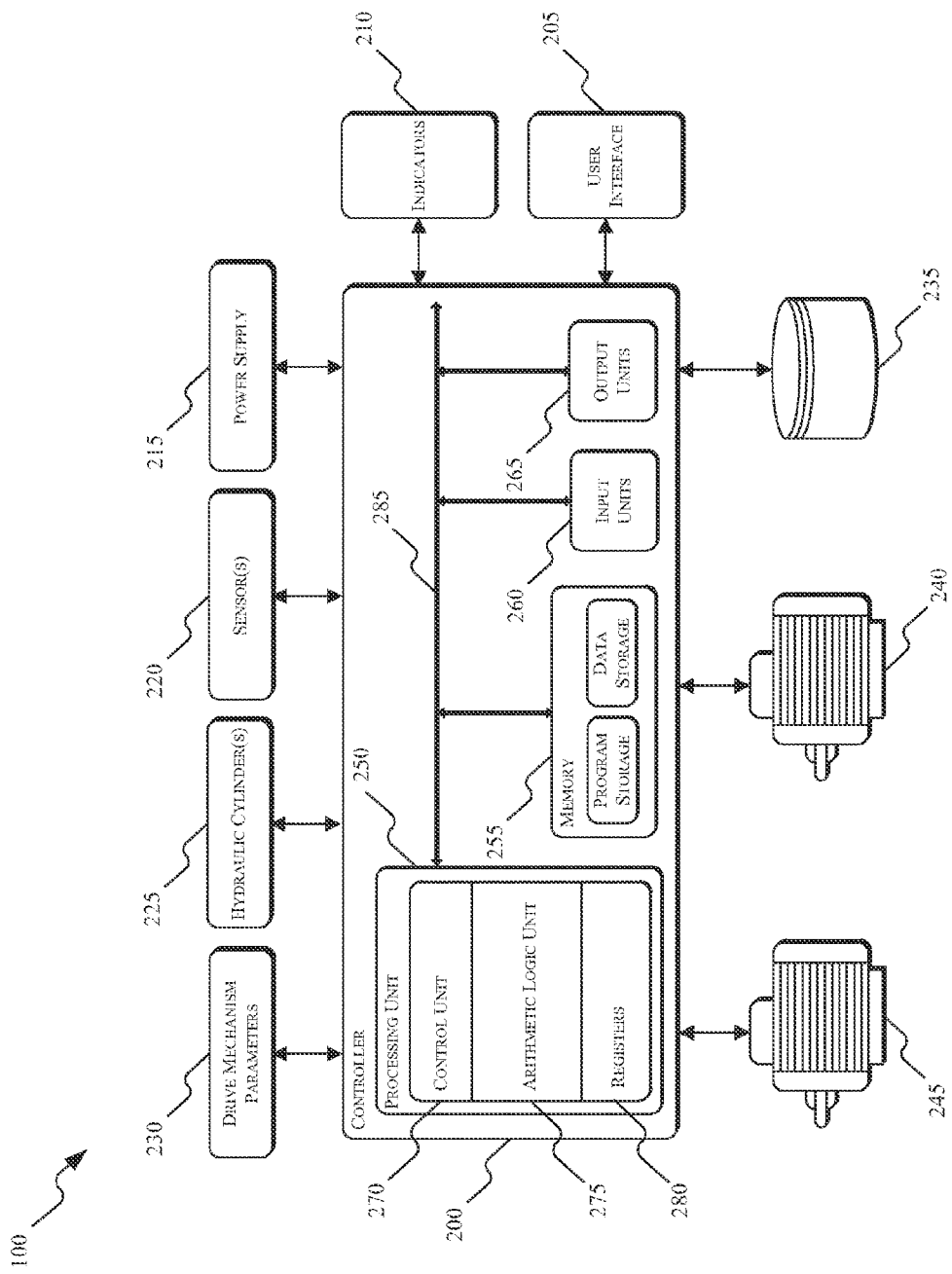
FIG. 2 illustrates a controller for a chain conveyor according to one embodiment of the invention.

FIG. 2 illustrates a controller 200 associated with the AFC 100. The controller 200 is connected or coupled to a variety of additional modules or components of the AFC 100, such as a user interface module 205, one or more indicators 210, a power supply module 215, one or more sensors 220, one or more hydraulic cylinders 225, a drive mechanism or motor parameters module 230, a data store or database 235, a first drive mechanism and drive 240 (e.g., associated with the maingate), and a second drive mechanism and drive 245 (e.g., associated with the tailgate). In some embodiments, the first drive mechanism and drive 240 includes a first motor and a first motor drive, and the second drive mechanism and drive 245 includes a second motor and second motor drive. In some embodiments, a first motor and first motor drive 240 and the second motor and second motor drive 245 each include switchgear assemblies. Embodiments of the invention described herein are described with respect to the drive mechanisms and drives being motor and motor drives. The one or more sensors 220 are, for example, power transducers within the AFC 100 configured to measure or sense an electrical characteristic (e.g., current, voltage, power factor, torque, speed, input power, output power, etc.), load cells, etc. The controller 200 includes combinations of hardware and software that are operable to, among other things, control the operation of the AFC 100, control the position of the one or more hydraulic cylinders 225, activate the one or more indicators 210 (e.g., a liquid crystal display ["LCD"]), monitor the operation of the AFC 100, etc. The one or more sensors 220 include, among other things, a loadpin strain gauge, one or more load cells, one or more tachometers, etc.

In some embodiments, the controller 200 includes a plurality of electrical and electronic components that provide power, operational control, and protection to the components and modules within the controller 200 and/or the AFC 100. For example, the controller 200 includes, among other things, a processing unit 250 (e.g., a microprocessor, a microcontroller, or another suitable programmable device), a memory 255, input units 260, and output units 265. The processing unit 250 includes, among other things, a control unit 270, an arithmetic logic unit ("ALU") 275, and a plurality of registers 280 (shown as a group of registers in FIG. 2), and is implemented using a known computer architecture, such as a modified Harvard architecture, a von Neumann architecture, etc. The processing unit 250, the memory 255, the input units 260, and the output units 265, as well as the various modules connected to the controller 200 are connected by one or more control and/or data buses (e.g., common bus 285). The control and/or data buses are shown generally in FIG. 2 for illustrative purposes. The use of one or more control and/or data buses for the interconnection between and communication among the various modules and components would be known to a person skilled in the art in view of the invention described herein. In some embodiments, the controller 200 is implemented partially or entirely on a semiconductor chip, is a field-programmable gate array ("FPGA"), is an application specific integrated circuit ("ASIC"), etc.

The memory 255 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices or data structures. The processing unit 250 is connected to the memory 255 and executes software instructions that are capable of being stored in a RAM of the memory 255 (e.g., during execution), a ROM of the memory 255 (e.g., on a generally permanent basis), or another non-transitory computer readable medium such as another memory or a disc. Software included in the implementation of the AFC 100 can be stored in the memory 255 of the controller 200. The software includes, for example, firmware, one or more applications, program data, filters, rules, one or more program modules, and other executable instructions. The controller 200 is configured to retrieve from memory and execute, among other things, instructions related to the control processes and methods described herein. In other constructions, the controller 200 includes additional, fewer, or different components.

The drive mechanism or parameters module 230 is connected to or associated with the motors and drives 240, 245 that are coupled to the first sprocket and/or the second sprocket. The parameters module 230 is connected to or included in, for example, one or more switchgears. The parameters module 230 is configured to receive signals associated with one or more parameters (e.g., current, voltage, power factor, torque, speed, input power, output power, etc.) of the motors 240, 245. In some embodiments, the parameters module 230 receives signals related to the motor parameters. In other embodiments, the parameters module 230 includes or is connected to the one or more sensors 220 for sensing the motor parameters.

The motors 240, 245 are controlled by control signals received from the controller 200 or another associated controller. The motors are also coupled to gear reduction boxes to reduce the rotational speed of the motor to a rotational speed appropriate for the sprockets and conveyor. In some implementations, the controller 200 is configured to control the motors and the AFC autonomously using the sensors 220 and one or more stored programs or modules. In other implementations, the controller 200 is configured to control the motors and the AFC based on a combination of manual inputs and automatic controls. The one or more hydraulic cylinders 225 also receive control signals from the controller 200, and selectively extend the return end frame (e.g., change the position of the one or more hydraulic cylinders, the first sprocket, the second sprocket, etc.) based on the control signals from the controller 200. The controller 200 also monitors the motors and the one or more hydraulic cylinders 225 to determine related characteristics. For example, the controller 200 can monitor or sense electrical characteristics of the one or more motors, the position of the one or more hydraulic cylinders 225 (e.g., an extension of the one or more hydraulic cylinders), etc. Although a single controller is illustrated, in other constructions, the controller 200 may be separated into a plurality of controllers. For example, the controller 200 may be separated into a consolidated control unit ("CCU"), a programmable control unit ("PCU"), etc. The CCU can be housed in an explosion-proof enclosure and provides control over the conveyor system. The PCU is an intrinsically safe system that can be interfaced with the CCU for, among other things, stopping, inhibiting, tripping, etc., the operation of the conveyor.

The user interface module 205 is used to control or monitor the AFC or the mining system. For example, the user interface module 205 is operably coupled to the controller 200 to control the speed of the conveyor, the speed of the one or more motors, etc. The user interface module 205 can include a combination of digital and analog input or output devices required to achieve a desired level of control and monitoring for the AFC. For example, the user interface module 205 can include a display and input devices such as a touch-screen display, one or more knobs, dials, switches, buttons, etc. The display is, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, etc. In other constructions, the display is a Super active-matrix OLED ("AMOLED") display. The user interface module 205 can also be configured to display conditions or data associated with the AFC in real-time or substantially real-time. For example, the user interface module 205 is configured to display measured electrical characteristics of the AFC, the status of the AFC, chain tensions, fault conditions (e.g., slack chain, zero tension chain, etc.), an amount of mined material on the conveyor, etc. In some implementations, the user interface module 205 is controlled in conjunction with the one or more indicators 210 (e.g., LEDs) to provide visual indications of the status or conditions of the AFC.

Figure 3A:
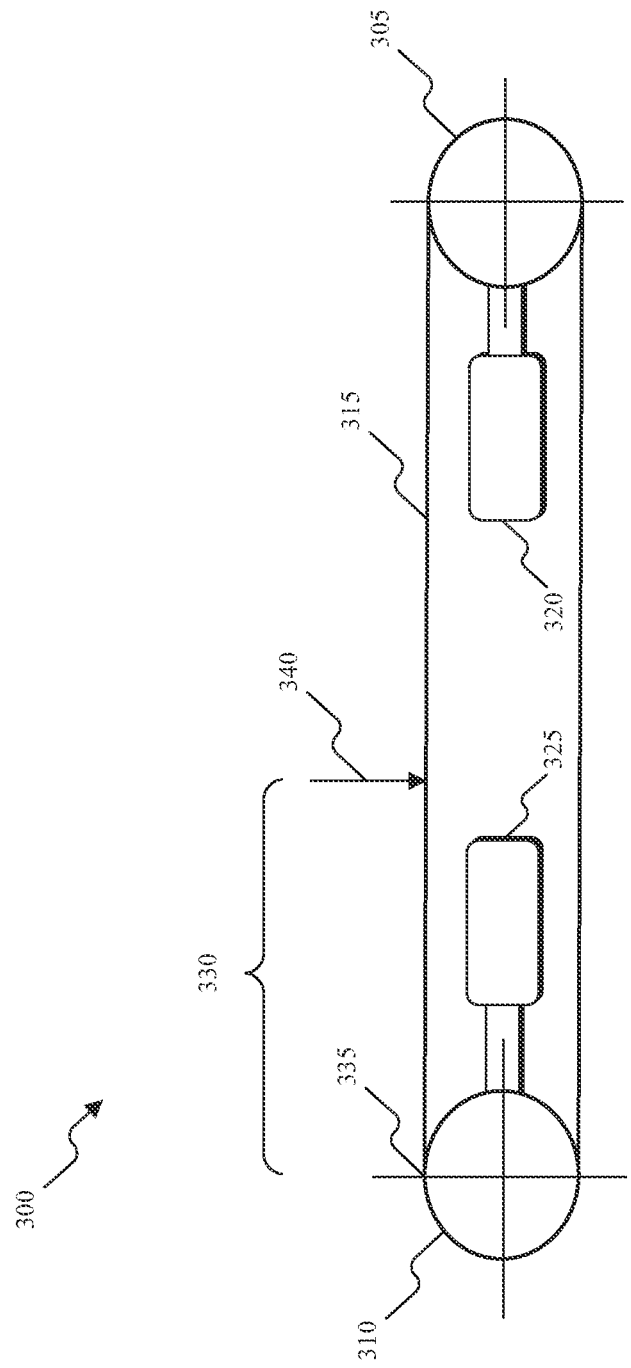
Figure 3C:
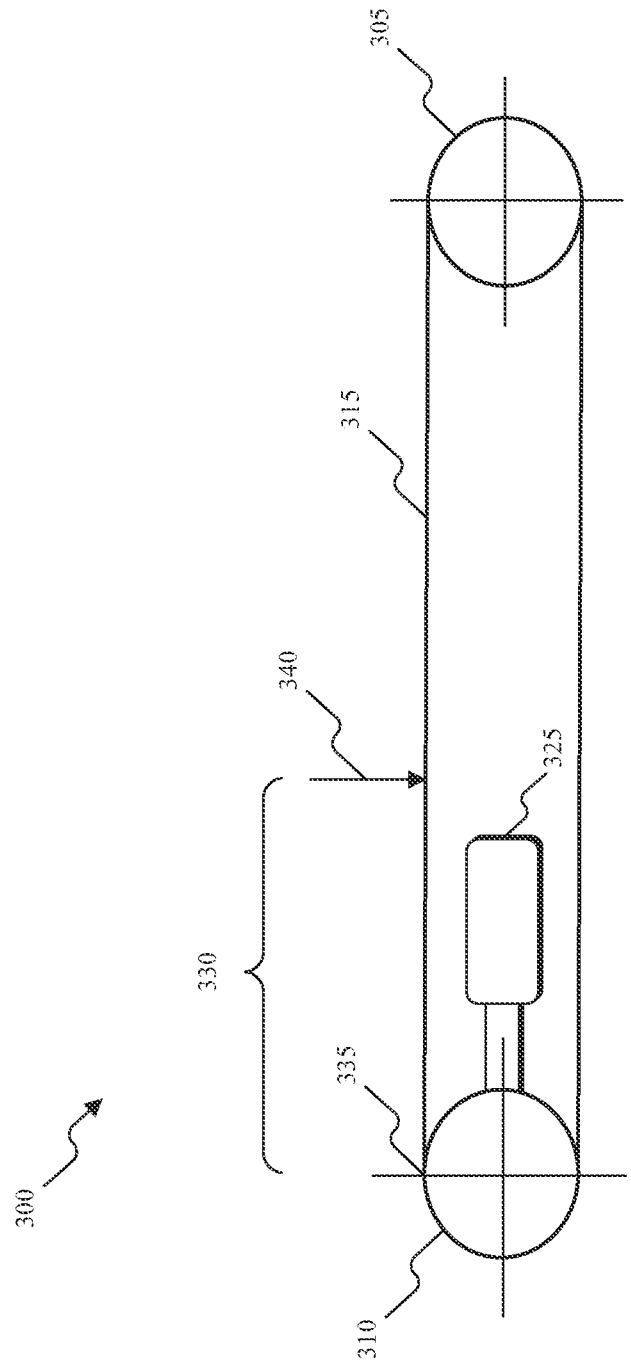

A generalized illustration of a conveyor 300 for a mining system is illustrated in FIG. 3A. The conveyor 300 includes a first sprocket or maingate sprocket 305, a second sprocket or tailgate sprocket 310, a chain 315, a first hydraulic cylinder 320, a second hydraulic cylinder 325, and a chain zone of interest or "danger zone" 330. The zone 330 is illustratively shown as an area between a top-dead-center ("TDC") point 335 of the second sprocket 310 and a loading point 340 (i.e., the point on the top portion of the chain where material is being loaded onto the conveyor). The zone 330 represents the portion of the chain 315 that is most likely to experience a slack chain (i.e., low-tension) condition. The tension of the chain 315 at the zone 330 can be determined and used to control the relative positions of the first sprocket 305 and the second sprocket 310. The relative positions of the sprockets can be modified by controlling the first hydraulic cylinder 320 and the second hydraulic cylinder 325. FIGS. 3B and 3C illustrate conveyors according to embodiments of the invention that include one hydraulic cylinder connected to either the first sprocket 305 or the second sprocket 310.

Figure 4:
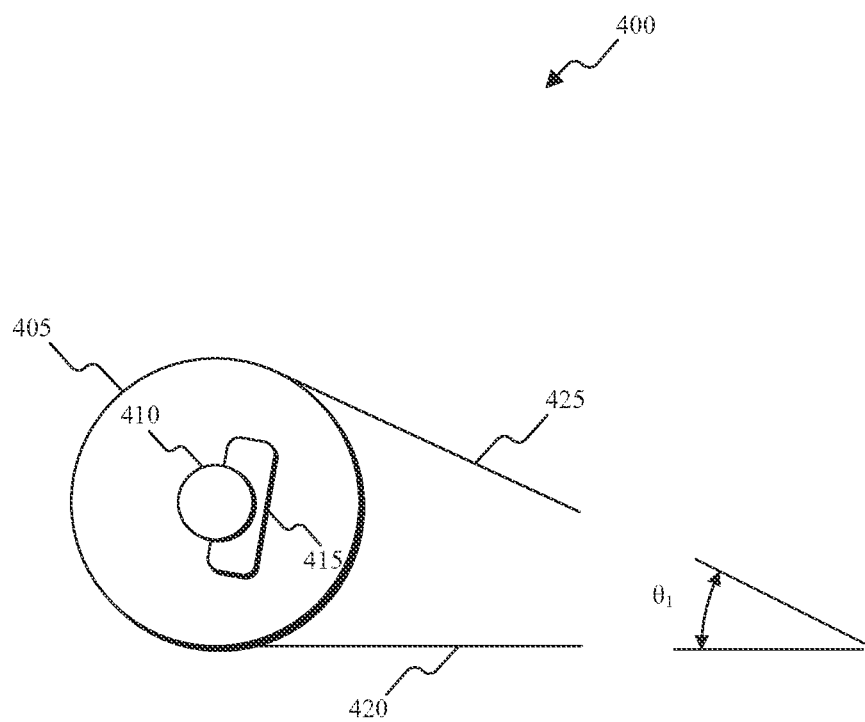
FIG. 4 illustrates a sprocket for a conveyor and a chain angle coming off of the sprocket.

In real-world implementations of AFC's for mining application, the conveyor and chain are not formed from entirely parallel top and bottom portions of the chain, as illustrated in FIGS. 3A, 3B, and 3C. Rather, for example, the end frame of the AFC is rounded near the sprockets and elevates the chain before returning the chain to a height or level where material is to be loaded. The shape of the end frame is a result of the size of the sprockets that are used in mining applications. In some embodiments, the sprockets are approximately one meter in diameter. As a result of the size of the sprockets, the chain is paid out of the end frame at a fixed angle, as illustrated in FIG. 4. FIG. 4 illustrates a stripped down version 400 of the return end frame 105 of the AFC 100. FIG. 4 illustrates a sprocket 405, a bearing (or shaft) 410, a load cell 415, a bottom portion of the chain 420 and a top portion of the chain 425. Due to the geometry of the return end frame 105, the top portion of the chain 425 comes off of the sprocket 405 at a first angle, $\theta_1$. The first angle, $\theta_1$, is a substantially fixed angle.

Figure 5:
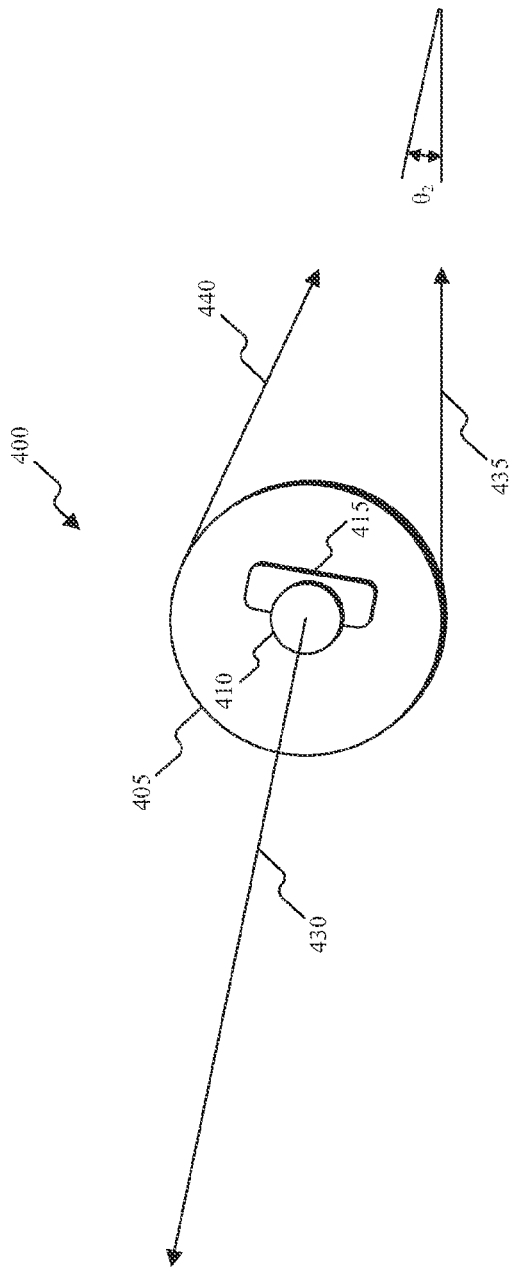
FIG. 5 is a diagram illustrating a sprocket reaction force and a chain force.

The forces associated with the end frame 400 of FIG. 4 are illustrated in FIG. 5. A sprocket reaction force 430 (e.g., a sprocket bearing reaction force) of the end from 400 is illustrated as a vector having a magnitude and an angle, $\theta_2$. Because the geometry of the end frame 400 is substantially fixed, the angle, $\theta_2$, of the reaction force is also substantially fixed. As such, only the magnitude of the reaction force will vary. The reaction force vector is then formed from the magnitude of the reaction force and the fixed angle, $\theta_2$, of the reaction force. A force from the bottom portion of the chain 435 is illustrated as a vector having a magnitude and an angle. The angle of the force from the bottom portion of the chain 435 is substantially parallel to the ground in the frame of reference of the end frame 400. As such, the angle of the force vector for the bottom portion of the chain 435 is substantially zero. A force from the top portion of the chain 440 is also illustrated as a vector having a magnitude and an angle. As previously indicated, the angle, $\theta_1$, at which the chain comes off of the sprocket 405, is substantially fixed.

The sprocket reaction force 430 can be measured using the load cell 415. Because the geometry of the end frame 400 is fixed, the load cell 415 can be positioned with respect to the sprocket 405 and the bearings 410 such that it is substantially perpendicular to the angle of the sprocket reaction force 430. By implementing the load cell 415 in such a way, the output of the load cell 415 is a direct measurement of the sprocket reaction force 430. In some embodiments, the load cell is implemented differently and the controller 200 calculates the sprocket reaction force 430 from the output of the load cell 415 (i.e., the load cell 415 is not positioned perpendicularly with respect to the angle of the sprocket reaction force 430).

The force from the bottom portion of the chain 435 is determined based on a characteristic of the drive mechanism or motor for the sprocket 405. For example, one or more sensors can be implemented in or associated with a motor for the sprocket 405. The sensors are operable to provide the controller 200 with signals that are related to characteristics of the drive mechanism, such as voltage, current, speed, torque, power, etc. In some embodiments, a torque or shaft torque associated with the motor is measured directly. In other embodiments, a speed of the motor and a power (e.g., voltage multiplied by current) of the motor are used to calculate a torque or shaft torque of the motor. Once the torque or shaft torque of the motor has been determined, the force associated with the bottom portion of the chain 435 can be calculated or determined. For example, the sprocket 405 has a fixed and known diameter (e.g., approximately one meter in diameter). Using the torque and the known radius of the sprocket 405 (i.e., the radius is one-half of the diameter), the force at, for example, a bottom-dead-center ("BDC") point of the sprocket 405 can be determined. This determined force represents the force from the bottom portion of the chain 435.

Figure 6:
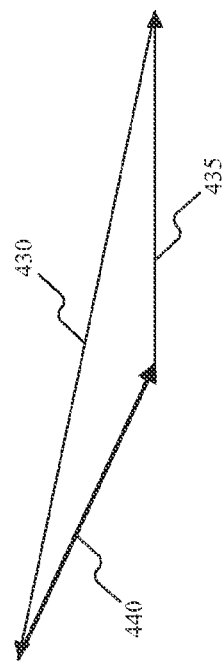
FIG. 6 is a diagram illustrating a vector summation of a sprocket reaction force and a chain force.

The force from the top portion of the chain 440 can be determined based on the sprocket reaction force 430 and the force from the bottom portion of the chain 435. As illustrated in FIG. 6, a vector summation of the sprocket reaction force 430 and the force from the bottom portion of the chain 435 provides the force vector 440 for the top portion of the chain. After the force from the top portion of the chain 435 has been calculated or determined, the force can be used to control hydraulic cylinders and the relative positions of the conveyor sprockets. In some embodiments, the force from the top portion of the chain 435 is used to control hydraulic cylinders and the relative positions of the conveyor sprockets. In other embodiments, the force from the top portion of the chain 435 is used to determine a tension in the top portion of the chain. The tension in the top portion of the chain is then used to control hydraulic cylinders and the relative positions of the conveyor sprockets. For example, based on the determined tension in the top chain portion, the controller 200 is operable to automatically control the position of one or more hydraulic cylinders to control the relative distance between two sprockets.

Specifically, the one or more hydraulic cylinders 225 are controlled to increase or decrease the distance between the first sprocket and the second sprocket to compensate for the tension in the chain. By automatically controlling the position of the hydraulic cylinders 225, the tension in the chain throughout the operation of the AFC can be continuously and automatically modified or adjusted to maintain the tension of the chain within a predetermined or desired window (e.g., that reduces damage to or wear on the AFC). Additionally, automatically controlling the position of the hydraulic cylinders 225, as described, allows the controller 200 to implement a variety of mechanisms for improving operation of the AFC. For example, the controller 200 can also shut down the AFC in the event of a loss of chain tension, loss of hydraulic pressure, unplanned change in the position of the hydraulic cylinder, when the position of the hydraulic cylinder is supposed to have been modified but no modification was detected, etc.

Figure 7:
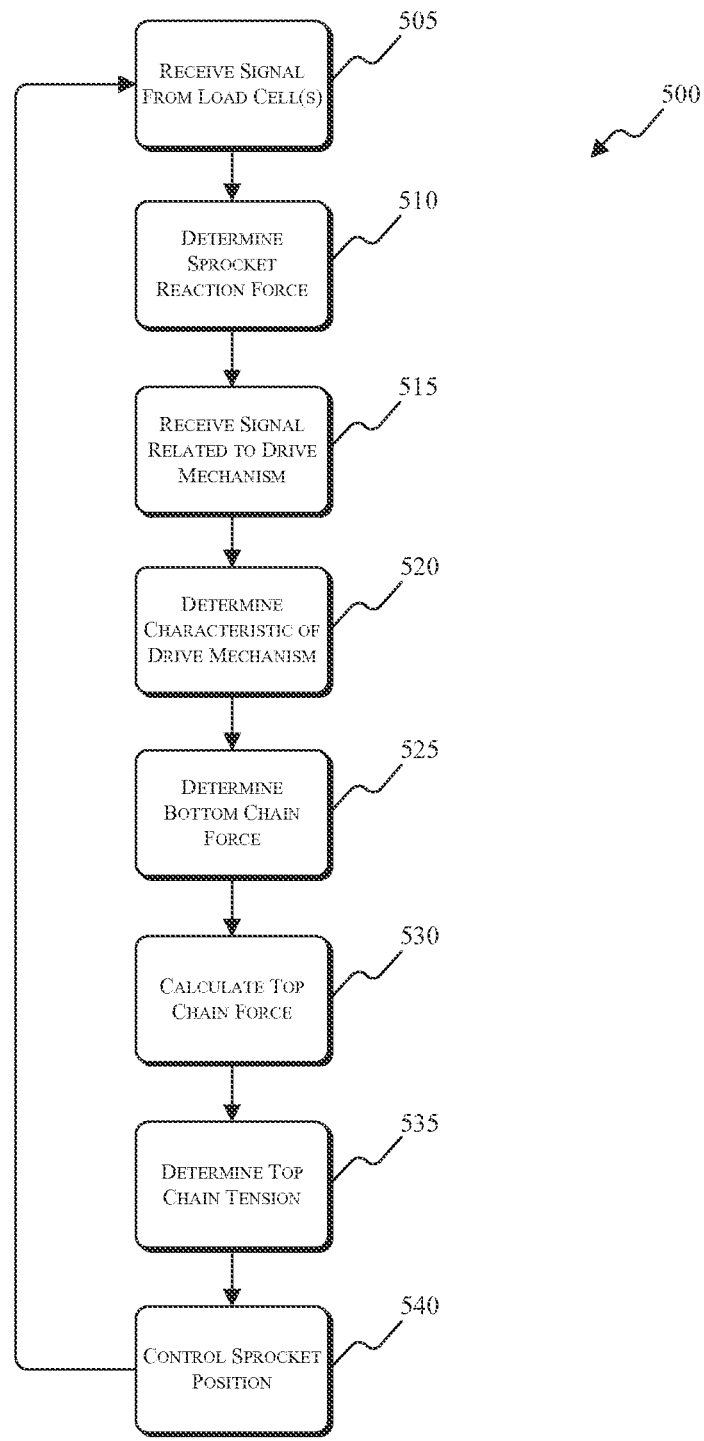
FIG. 7 is a process for controlling a position of a hydraulic cylinder for a chain conveyor.

FIG. 7 is a process 500 for controlling the AFC. The process 500 begins with the controller 200 receiving one or more signals from one or more load cells (step 505). The load cells are positioned with respect to the first sprocket, the second sprocket, or each of the first sprocket and the second sprocket. The load cells are, for example, positioned perpendicularly with respect to the reaction force on the bearings of the sprocket. Because the top and bottom portions of the chain interact with the sprocket at fixed entry and exit angles, the angle of the reaction force, $\theta_2$, is fixed. As a result, only the magnitude of the reaction force changes. A vector of the sprocket reaction force is composed of the magnitude of the reaction force and the fixed angle of the reaction force. After receiving the one or more signals from the lone or more load cells, the controller 200 determines the magnitude of the sprocket reaction force (step 510).

The controller 200 also receives a signal from a sensor related to a drive mechanism of the conveyor (step 515). The drive mechanism is, for example, a motor, and the signal from the sensor is a characteristic of the motor such as motor voltage, motor current, motor speed, motor power, motor torque, etc. Based on the signal received from the sensor, the controller 200 determines a characteristic of the drive mechanism (step 520). In some embodiments, the controller 200 receives a plurality of signals from the sensor, or signals from a plurality of sensors (e.g., indicative of motor speed, motor power, motor current, etc.). The characteristic of the drive mechanism is, for example, a torque or shaft torque. In some embodiments, the shaft torque is calculated based on a rotational speed of a motor and a power of the motor. In other embodiments, the shaft torque is measured directly or determined based on motor current.

The controller then calculates a force acting on the bottom portion of the chain based on the characteristic of the drive mechanism (step 525). For example, the diameter of the sprocket is fixed (e.g., approximately one meter in diameter). Using the determined sprocket shaft torque and the known diameter (and radius) of the sprocket, a force from the bottom portion of the chain can be calculated. The force from the bottom portion of the chain is substantially parallel to, for example, the ground (e.g., an angle of approximately 0°). The magnitude of the force from the bottom portion of the chain and its angle form a force vector for the bottom portion of the chain.

The vector corresponding to the magnitude and angle of the force from the bottom portion of the chain and the vector corresponding to the sprocket reaction force can be summed (i.e., a vector summation) to calculate a force from the top portion of the chain (step 530). The force from the top portion of the chain is a result of the tension in the top portion of the chain. The controller 200 is able to use the relationship between force and tension in the top portion of the chain to determine the tension of the top portion of the chain (step 535). For example, the relationship between the force from the top chain portion and the tension in the top portion of the chain can be stored in memory (e.g., the memory 255). The relationship can be stored as one or more functions, one or more look up tables ("LUTs"), or as a series of thresholds to which the force is compared. In some embodiments, after the force from the top portion of the chain has been determined, Newtonian physics (e.g., a summation of forces) is used to determine the tension in the top portion of the chain. In other embodiments, the tension in the top portion of the chain is inferred from the magnitude of the force from the top portion of the chain.

After step 535, the controller 200 uses the determined tension in the top portion of the chain to control a position of a sprocket of the conveyor. The position of the sprocket is controlled by controlling the position of a hydraulic cylinder associated with the sprocket. As described above, in some embodiments, one or both of the sprockets have a hydraulic cylinder associated with them. A linear transducer can be used to determine the position of the hydraulic cylinder (e.g., the position of a piston within the hydraulic cylinder). If, based on the tension in the top portion of the chain, the tension needs to be increased or decreased; the position of the hydraulic cylinder can be adjusted. By adjusting the position of the hydraulic cylinder, the relative positions of the two conveyor sprockets (e.g., maingate and tailgate sprockets) can be increased or decreased (i.e., the distance between the sprockets can be increased or decreased). As the hydraulic cylinder is used to control the relative positions of the sprocket, the process 500 returns to step 505 to again determine the tension in the top portion of the chain. In some embodiments, the tension in the top portion of the chain is continuously and incrementally modified to achieve or maintain a desired level of tension. For example, as the loading point of the conveyor changes (e.g., as the shearer is moved along the face of a mine) the tension in the top portion of the chain from loading is constantly changing. Continuously modifying the relative positions of conveyor sprockets allows the controller 200 to compensate for these constant changes in tension.

Additionally, the control techniques described above can be applied to pre-tensioning of the AFC. In such instances, the sprocket reaction force is measured with a static chain. The resulting force from the top portion of the chain is related to a true chain pre-tension. The pre-tension can then be adjusted as necessary to achieve the desired level of pre-tensioning.

Thus, the invention may generally provide, among other things, systems, methods, devices, and computer readable media for controlling the operation of a mining system based on a sprocket reaction force and a determined chain tension.

What is claimed is:

1. A conveyor for a mining system, the conveyor comprising:
    a first sprocket having a first position;
    a second sprocket having a second position, the first position being separated from the second position by a distance;
    a chain associated with the first sprocket and the second sprocket, the chain having a top chain portion and a bottom chain portion;
    a drive mechanism coupled to one of the first sprocket or the second sprocket, the drive mechanism operable to drive the one of the first sprocket or the second sprocket;
    a sensor operable to generate a first signal related to a characteristic of the drive mechanism;
    a load cell operable to directly measure a reaction force of the one of the first sprocket or the second sprocket and generate a second signal related to the reaction force of the one of the first sprocket or the second sprocket;
    a hydraulic cylinder; and
    a controller including a processing unit and a non-transitory computer readable data storage medium, the controller configured to
        receive the first signal from the sensor,
        receive the second signal from the load cell,
        calculate a tension of the top chain portion based on the first signal and the second signal, and
        generate a control signal for controlling a position of the hydraulic cylinder based on the determined tension of the top chain portion to control the distance between the first sprocket and the second sprocket.

2. The conveyor of claim 1, wherein the drive mechanism is a motor.

3. The conveyor of claim 2, wherein the characteristic includes a motor current or a motor torque.

4. The conveyor of claim 1, wherein the controller is further configured to calculate a force from the bottom chain portion based on the first signal, and wherein the controller is further configured to calculate a vector sum of the force from the bottom chain portion and the reaction force of the one of the first sprocket or the second sprocket to determine a force from the top chain portion.

5. The conveyor of claim 4, wherein the tension of the top chain portion is determined based on the force from the top chain portion.

6. The conveyor of claim 1, wherein an angle of the reaction force of the one of the first sprocket or the second sprocket is fixed.

7. The conveyor of claim 6, wherein the load cell is positioned perpendicularly to the angle of the reaction force of the one of the first sprocket and the second sprocket.

8. A method of controlling tension of a conveyor chain, the conveyor chain having a top chain portion and a bottom chain portion, the method comprising:
    receiving, from a sensor, a first signal related to a characteristic of a drive mechanism, the drive mechanism operable to drive a sprocket;
    receiving, from a load cell, a second signal related to a reaction force of the sprocket, the load cell directly measuring a reaction force of a sprocket;
    calculating, with a processor, a tension of the top chain portion of the conveyor chain based on the first signal and the second signal; and
    generating a control signal for controlling a position of a hydraulic cylinder based on the calculated tension of the top chain portion.

9. The method of claim 8, wherein the drive mechanism is a motor.

10. The method of claim 9, wherein the characteristic includes a motor current or a motor torque.

11. The method of claim 8, further comprising calculating a force from the bottom chain portion based on the first signal, and calculating a vector sum of the force from the bottom chain and the reaction force of the sprocket.

12. The method of claim 11, further comprising determining a force from the top chain portion based on the vector sum.

13. The method of claim 8, wherein an angle of the reaction force of the sprocket is fixed.

14. A conveyor for a mining system, the conveyor comprising:
   a sprocket;
   a chain associated with the sprocket, the chain having a top chain portion and a bottom chain portion;
   a drive mechanism coupled to the sprocket, the drive mechanism operable to drive the sprocket;
   a hydraulic cylinder; and
   a controller including a processing unit and a non-transitory computer readable data storage medium, the controller configured to
      receive, from a sensor, a first signal related to a characteristic of the drive mechanism,
      receive, from a load cell, a second signal related to a reaction force of the sprocket, the load cell directly measuring a reaction force of the sprocket,
      calculate a tension of the top chain portion based on the first signal and the second signal, and
      generate a control signal for controlling a position of the hydraulic cylinder based on the determined tension of the top chain portion.

15. The conveyor of claim 14, wherein the drive mechanism is a motor.

16. The conveyor of claim 15, wherein the characteristic includes a motor current or a motor torque.

17. The conveyor of claim 14, wherein the controller is further configured to calculate a force from the bottom chain portion based on the first signal, and wherein the controller is further configured to calculate a vector sum of the force from the bottom chain and the reaction force of the one of the first sprocket or the second sprocket to determine a force from the top chain portion.

18. The conveyor of claim 17, wherein the tension of the top chain portion is calculated based on the force acting on the top chain portion.

19. The conveyor of claim 14, wherein an angle of the reaction force of the one of the first sprocket or the second sprocket is fixed.

* * * * *